US010646916B2

(12) United States Patent
Rohrbacker et al.

(10) Patent No.: US 10,646,916 B2
(45) Date of Patent: May 12, 2020

(54) COMPOSITION AND METHOD TO FORM DISPLACEMENTS FOR USE IN METAL CASTING

(71) Applicant: Destech Corporation, Tucson, AZ (US)

(72) Inventors: David A. Rohrbacker, Tucson, AZ (US); Jon Chatwood, Tucson, AZ (US); William Palmer, Tucson, AZ (US)

(73) Assignee: Destech Corporation, Tucson, AZ (US)

( * ) Notice: Subject to any disclaimer, the term of this patent is extended or adjusted under 35 U.S.C. 154(b) by 0 days.

(21) Appl. No.: 16/157,941

(22) Filed: Oct. 11, 2018

(65) Prior Publication Data

US 2019/0039122 A1  Feb. 7, 2019

Related U.S. Application Data

(63) Continuation of application No. PCT/US2017/028000, filed on Apr. 17, 2017, which
(Continued)

(51) Int. Cl.
*B22C 9/10* (2006.01)
*C04B 35/524* (2006.01)
(Continued)

(52) U.S. Cl.
CPC .................. *B22C 9/10* (2013.01); *B22C 1/02* (2013.01); *B22C 1/22* (2013.01); *B22C 3/00* (2013.01);
(Continued)

(58) Field of Classification Search
CPC ............ C04B 35/524; C04B 2235/616; C04B 41/0018; C04B 41/457; C04B 41/48; B22C 9/10; B28B 1/14
See application file for complete search history.

(56) References Cited

U.S. PATENT DOCUMENTS 3,688,832 A    9/1972  Horton
4,789,506 A *  12/1988 Kasprzyk .................. B28B 1/14
                                                                264/112
(Continued)

FOREIGN PATENT DOCUMENTS

GB      2373747      10/2002
JP      H07241658    9/1995
WO      2009097619   8/2009

OTHER PUBLICATIONS

Bertarione et al. "Furfuryl Alcohol Polymerization in H-Y Confined Spaces: Reaction Mechanism and Structure of Carbocationic Intermediates". Journal of Physical Chemistry B (2008) 112, 9, pp. 2580-2589. (Year: 2008).*

*Primary Examiner* — Erin Snelting
(74) *Attorney, Agent, or Firm* — Quarles & Brady LLP; Yakov Sidorin

(57) ABSTRACT

A method to form a displacement includes disposing a powder blend (comprising a plurality of ground ceramic particles and a plurality of ground resin particles) into a mold, densifying the powder blend while in the mold, heating the mold to form a first displacement, impregnating said first displacement with a polymer precursor compound to form a second displacement, and heating the second displacement to form a third displacement.

14 Claims, 5 Drawing Sheets

Related U.S. Application Data is a continuation of application No. 15/132,031, filed on Apr. 18, 2016, now abandoned.

(51) Int. Cl.

| | | |
|---|---|---|
| *C04B 35/634* | (2006.01) |
| *C04B 35/80* | (2006.01) |
| *B22C 1/02* | (2006.01) |
| *B22C 1/22* | (2006.01) |
| *B22C 3/00* | (2006.01) |
| *C04B 35/14* | (2006.01) |

(52) U.S. Cl.
CPC ............ *C04B 35/14* (2013.01); *C04B 35/524* (2013.01); *C04B 35/6348* (2013.01); *C04B 35/63476* (2013.01); *C04B 35/806* (2013.01); *C04B 2235/422* (2013.01); *C04B 2235/48* (2013.01); *C04B 2235/526* (2013.01); *C04B 2235/5216* (2013.01); *C04B 2235/5436* (2013.01); *C04B 2235/5463* (2013.01); *C04B 2235/616* (2013.01)

(56) References Cited

U.S. PATENT DOCUMENTS

| | | | | |
|---|---|---|---|---|
| 4,925,492 A | * | 5/1990 | Kelkar | ............... B22C 9/10 106/38.22 |
| 5,460,954 A | | 10/1995 | Krug | |
| 5,730,915 A | * | 3/1998 | Cornie | ............... B22C 1/00 164/23 |
| 2005/0035501 A1 | | 2/2005 | Chikugo | |
| 2009/0194912 A1 | * | 8/2009 | Rohrbacker | ......... C04B 26/122 264/430 |

\* cited by examiner

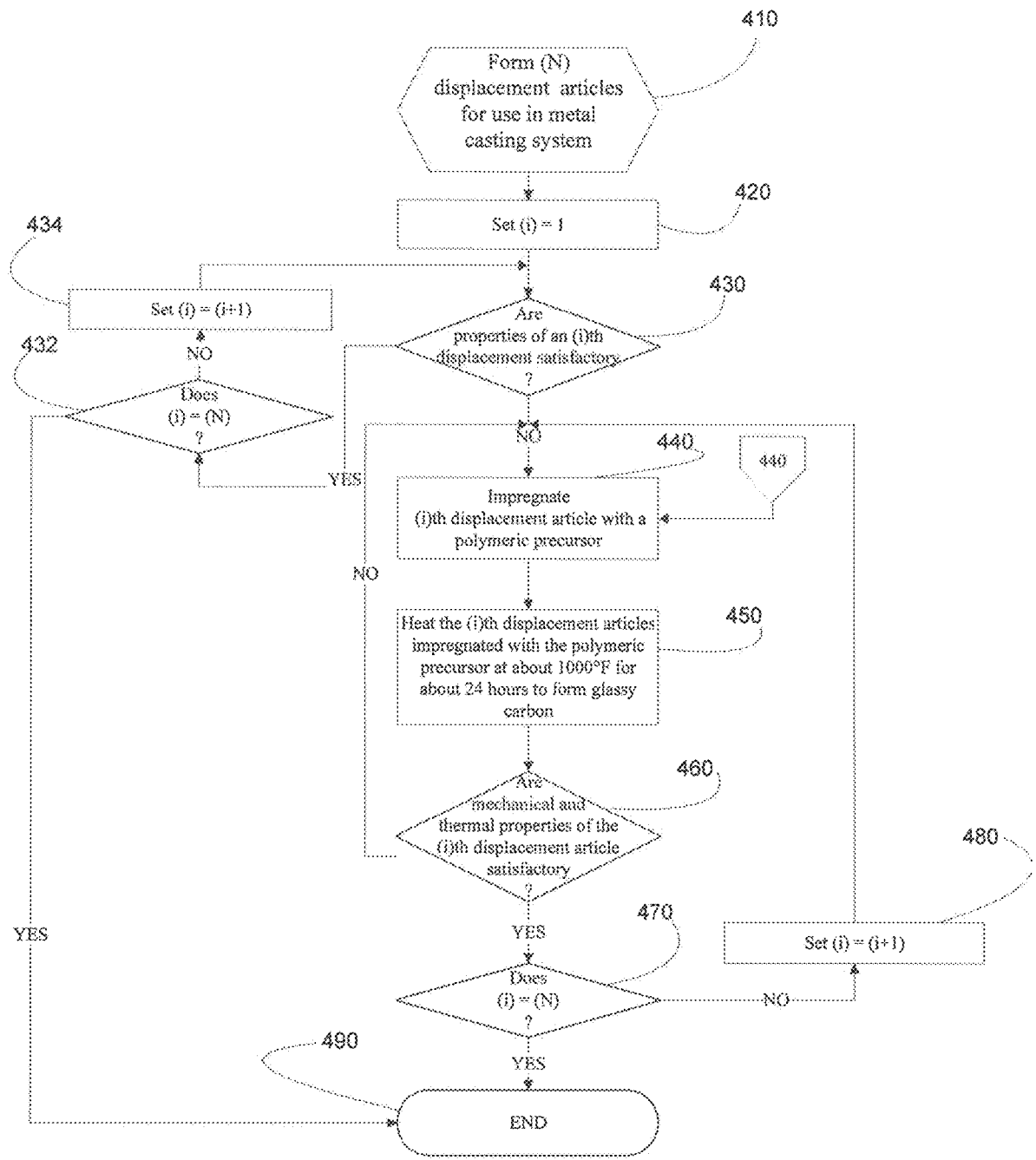

COMPOSITION AND METHOD TO FORM DISPLACEMENTS FOR USE IN METAL CASTING

CROSS-REFERENCE TO RELATED APPLICATIONS

The present application is a continuation of the pending International Application No. PCT/US2017/028000 filed on Apr. 17, 2017, which claims priority from the U.S. patent application Ser. No. 15/132,031, filed on Apr. 18, 2016. The disclosure of each of the above-mentioned applications is incorporated by reference herein. Also incorporated by reference is the disclosure of the U.S. Pat. No. 8,506,861.

TECHNICAL FIELD

This invention relates to a composition and method for forming one or more displacements for use in a metal, ceramic, or cermet casting process(es). In certain embodiments, the invention is directed to a composition, and method for use of that composition, to form one or more displacements for use in a metal, ceramic, or cermet casting process.

BACKGROUND

Foundry work involves the introduction or pouring of molten metal into a mold, which mold is formed to contain a hollow cavity defining or dimensioned according to a desired shape. Sand casting is one of the most popular and simple types of casting, because it allows for varying the sizes of batches and provides reasonable cost of the process.

The first step in the sand casting process is to create the mold. The sand is packed around the pattern to replicate the external shape of the casting. The cavity that forms the casting remains when the pattern is removed. Lubrication is often applied to the surfaces of the mold cavity in order to facilitate removal of the casting.

In certain embodiments, internal features of the casting are defined by separate displacements which are prepared prior to molding process.

SUMMARY

An embodiment provides a method to form a displacement or core for use in the metal casting process. The method includes providing a plurality of ceramic particles and a plurality of resin particles and grinding the plurality of ceramic particles until maximum dimension of those ceramic particles does not exceed a predetermined value, such as about 150 microns. The method may further include grinding the plurality of resin particles until those resin particles comprise a maximum dimension less than about 100 microns, subsequently forming a powder blend consisting of a mixture of the plurality of ground ceramic particles and the plurality of ground resin particles. In certain embodiments, the powder blend comprises a plurality of ground ceramic particles, a plurality of ground resin particles, and a plurality of reinforcing fibers. In other embodiments, the powder blend comprises a plurality of ground ceramic particles, a plurality of ground resin particles, and a cylindrical graphite member.

A related embodiment provides treatment(s) of the displacement or core for use in the metal casting process. These additional treatments enhance the mechanical strength of the displacement so that the displacement better survives the molten metal molding process. Embodiments of the additional treatment(s) contain steps of disposing a powder blend (including a plurality of ground ceramic particles and a plurality of ground resin particles) into a mold; densifying the powder blend while in the mold; heating the mold with the powder blend in it to form a first displacement; impregnating the first displacement with a polymer precursor compound to form a second displacement; and heating the second displacement to form a third displacement.

Further, the impregnation procedure includes immersing the first displacement in a liquid mixture (that comprises the polymer precursor compound); monitoring how weight of the first displacement is increased; and when the weight of the first displacement no longer increases with time, determining (producing an identifier) that the formation of the second displacement is complete. Moreover, the process of heating the second displacement to form a third displacement includes heating the second displacement at about 1000° C. for about 24 hour period of time.

The additional treatment process includes a step of heating the first displacement at about 1000° C. for about 24 hours before the first displacement is impregnated with the polymer precursor compound to form the second displacement.

Furthermore, in certain embodiments, the polymer precursor compound is selected from the group consisting of furfuryl alcohol, phenol formaldehyde oligomer, acetone-furfural, furfuryl alcohol-phenol oligomer, polyvinyl chloride oligomer, polyvinylidene chloride oligomer, polyacrylonitrile oligomer, and cellulose.

The embodiments of the additional treatment process also disclose that the formed third displacement may include glassy carbon moieties having ceramic particles disposed therein, wherein the glassy carbon comprises polymer(s) with specific identified structures and/or a fullerene having a specific identified structure.

BRIEF DESCRIPTION OF THE DRAWINGS

The invention will be better understood from a reading of the following detailed description taken in conjunction with the drawings in which like reference designators are used to designate like elements, and in which:

FIG. 4 shows a flow chart summarizing the steps of an embodiment of the method to form a casting displacement that comprise glassy carbon moieties.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The idea of the invention is described in reference to examples of embodiments, and in reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
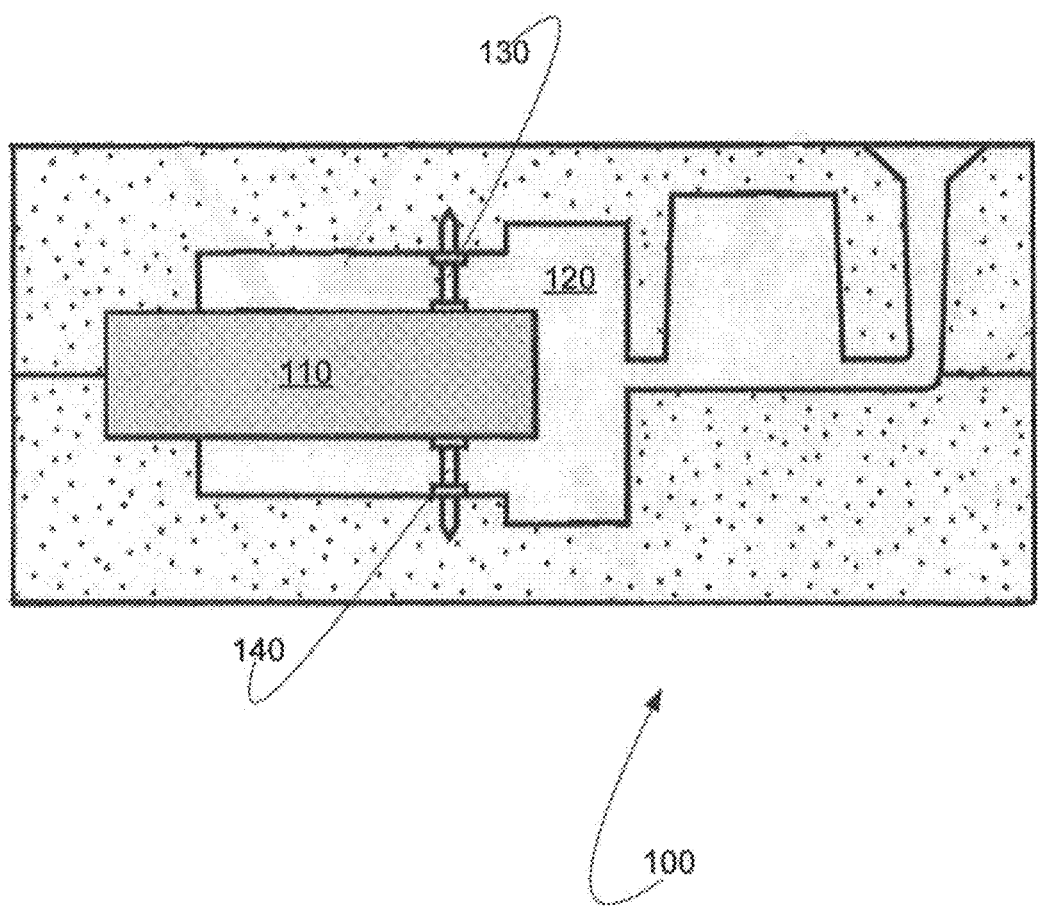
FIG. 1 illustrates a cross-sectional view of a metal casting mold.

Referring now to FIG. 1, a mold 100 comprises a displacement 110, cavity 120, chaplets 130 and 140. The displacement 110 is positioned within a cavity 120 and fastened by the chaplets 130 and 140. In operation, the liquid molten metal is then introduced into the mold 100. Liquid molten metal is introduced into mold 100 to fill the entire cavity 120, after which the molten metal that is poured into the mold then begins to cool and solidify.

When the entire cavity 120 is filled and the molten metal solidifies, the final shape of the casting is formed, in which any internal holes and passages of the casting are formed or established due to the insertion (initial presence) of the displacement 110.

Figure 2A:
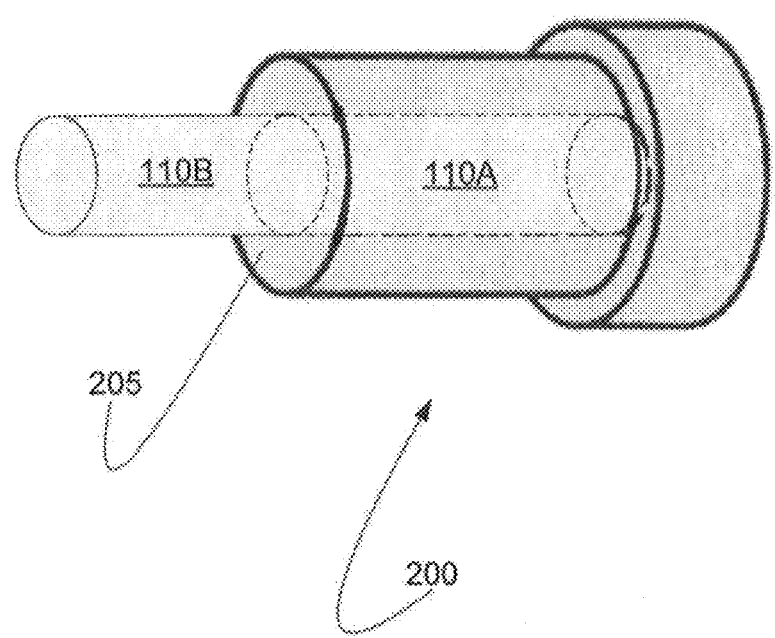
FIG. 2A shows a perspective view of a metal casting 200 with displacement(s) 110A/110B still inserted therein.
Figure 2B:
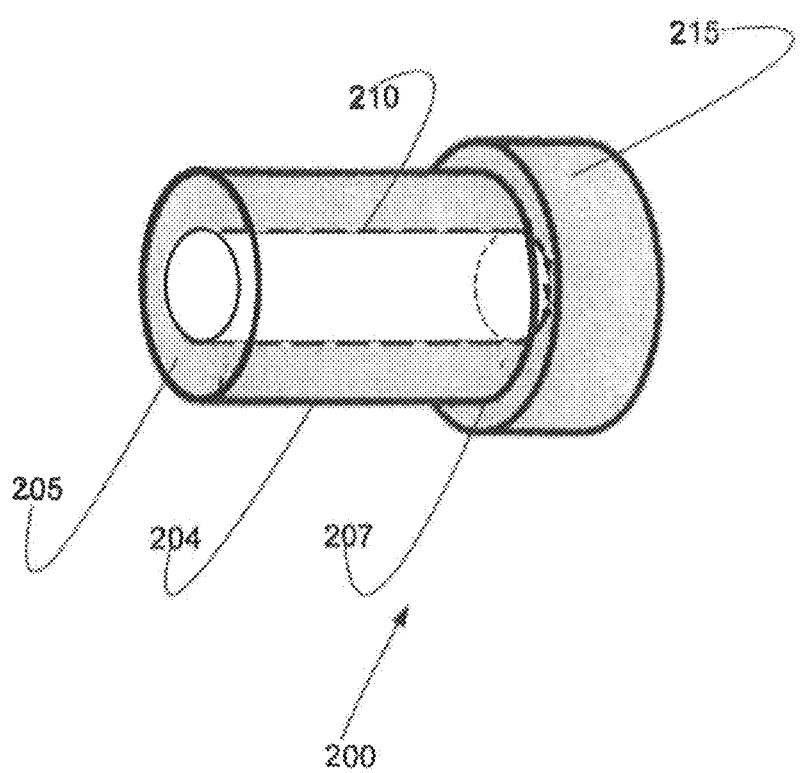
FIG. 2B shows a perspective view of the metal casting 200, from which displacement(s) 110A/110B have been removed.

FIG. 2A illustrates a metal casting molding 200, in which a distal end 110B of the displacement 110 (of FIG. 1) extends outwardly from the end 205 of the molding 200. FIG. 2B complements FIG. 2A by illustrating the metal casting 200, from which the displacement portions 110A and 110B have been removed. In certain embodiments, displacement portions 110A and 110B are removed with the use of a water spray under pressure.

Implementations of invention include a method for forming a displacement 200. In certain embodiments, the displacement can be a complex displacement comprising multiple compartments. For example, if a displacement is designed to assume the general form similar to that of the mold illustrated in FIG. 2B, such complex displacement would comprises a cylindrical body of a first diameter similar to the body 204 formed to include an aperture 210 extending inwardly from the distal end 205, in combination with an integral annular lip 215 of the second diameter disposed around the proximal end 207 of the cylindrical body, where the second diameter is greater than the first diameter.

Figure 3:
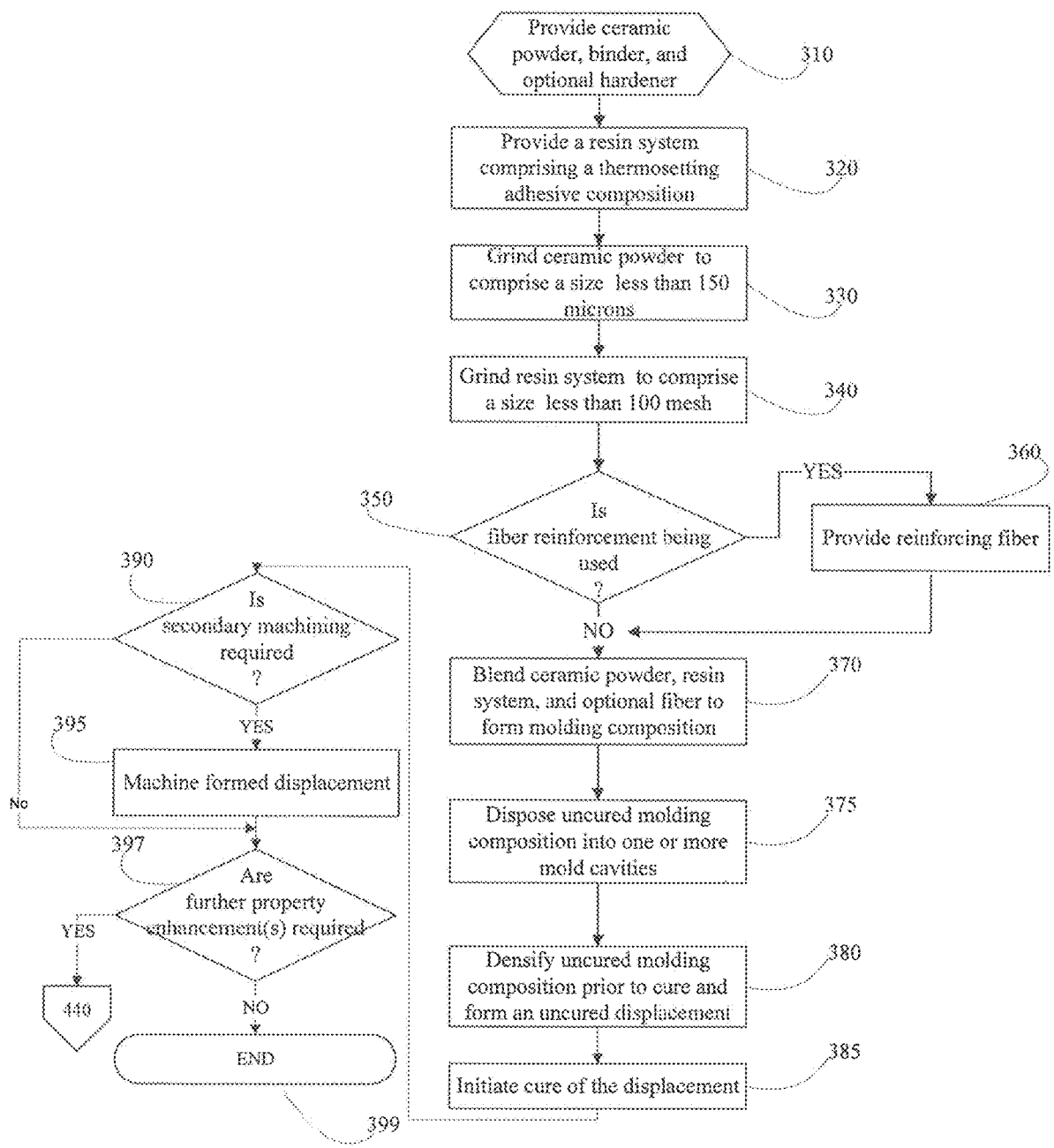
FIG. 3 is a flow chart summarizing the steps of an embodiment of the method to form a casting displacement without glassy carbon moieties.

FIG. 3 is a flow-chart summarizing the steps of a method to form a displacement (for a metal casting process) with the use of the specified molding composition. Referring now to FIG. 3, in step 310 the embodiment of the method provides a ceramic powder. In certain embodiments, that ceramic powder is selected from the group consisting of, but not limited to, silica, zirconia, olivine, magnesium oxide, silica carbide, aluminum oxide, and combinations thereof. In certain embodiments, the ceramic powder is a mixture of silica and aluminum oxide. If a molding composition comprises mostly silica, the molding composition does not have a sufficient compression strength and cracks when the molding composition is fired at 1000° C.

Step 320 further includes providing a resin system. In certain embodiments, the resin system of step 320 contains a thermosetting adhesive composition. In certain embodiments, the thermosetting resin system of step 310 is selected from the group consisting of a phenol-formaldehyde resin, a resorcinol-formaldehyde resin, a resol resin, a novalac resin, and a melamine resin. As those skilled in the art will readily appreciate, melamine resins are formed by a reaction of dicyandiamide with formaldehyde.

As those skilled in the art will further appreciate, phenolic resins, melamine resol resins, novalacs, and formaldehyde resins comprise/form strong bonds and exhibit good resistance to high temperatures. In certain embodiments, the resin system comprises a one-part system that cures with heat or heat and pressure. In other embodiments, the resin system comprises a resin, as described above, in combination with a hardener (when the resin system crosslinks, i.e. cures, with the application of heat).

In certain embodiments, the hardener includes a diamine. In certain embodiments, the hardener includes an aromatic diamine, such as (and without limitation) luene diamine, diphenylmethane diamine, and the like. In certain embodiments, the hardener includes an alkyl diamine, such as and without limitation, hexamethylene diamine.

In step 330 of the method, the ceramic powder formed at step 310 is being ground. The ceramic powder must be ground to smaller than about 150 microns. The use of powders having particles with diameters larger than about 150 microns was shown to result in the formation of displacements that have insufficient mechanical properties during the high-temperature metal casting process.

In certain embodiments, step 330 includes grinding the ceramic powder of step 310 until the particles comprising such powder have diameters smaller than about 150 microns. When using the term "about," Applicant means plus or minus ten percent (10%) with respect to the specified value. In certain embodiments, step 330 involves forming a ceramic powder with particles that have maximum dimensions of less than about 150 microns and greater than about 30 microns. In certain embodiments, the average particle maximum dimension is about 75 microns.

In step 340 of the method, the resin system of step 320 is being ground. The resin system must be ground to smaller than 150 microns. The use of resin systems with particles having a maximum dimension larger than about 150 microns results in the formation of displacements that have operationally-insufficient mechanical properties during the high temperature metal casting process.

In certain embodiments, at step 340 the grinding of the resin system of step 310 is carried out until the particles comprising that system have maximum dimensions of less than about 150 microns. In certain embodiments, step 340 includes producing a resin system with particles having maximum dimensions of less than about 150 microns and greater than about 30 microns. In certain embodiments, the average particle maximum dimension is about 75 microns.

In step 350 of the method, a determination is made if a fiber reinforcement is required or will be used. In certain embodiments, the displacements for metal casting process are formed without a fiber reinforcement. On the other hand, in related embodiments, the displacements are formed using one or more fiber reinforcements. If the election is made to not use a fiber reinforcement, then the process flow transitions from step 350 to step 370.

If a decision to use the fiber reinforcement is made, however, then the process flow transitions from step 350 to step 360, at which a plurality of reinforcing fibers is provided. In certain embodiments, a reinforcement fiber comprises a carbon fiber. In certain embodiments, the reinforcement fiber comprises fiber glass. The fiber glass reinforcement fibers have a low coefficient of thermal expansion and, in addition, high thermal conductivity. The resulting fiber-glass-reinforced displacements, then, comprise a dimensionally-stable material that more rapidly dissipates heat as compared to asbestos and organic fibers.

In certain embodiments, the fiber glass comprises a fiber glass mat. In certain embodiments, the fiber glass includes a plurality of uncoated milled fibers having a length of about 200 microns.

It was empirically found that using reinforcing fibers with a nominal length of about 200 microns imparts the optimal combination of mechanical strength and surface smoothness to the cured displacements. More specifically, the use of displacements comprising reinforcing fibers with a nominal length of about 200 microns resulted in optimal cavity formation in the metal casting process. Further, the use of longer fibers resulted in only a minimal enhancement of a mechanical property of the formed displacement, but also further resulted in a much rougher surface.

The embodiment of the method transitions from step 360 to step 370. At which blending of the ceramic powder, resin system, along with the optional fiber reinforcement of step 360, is taking place. In certain embodiments, step 370 comprises using a twin shell V blender for approximately 30 minutes using ⅛" alumina media to insure a nearly homogenous mixture.

The process flow further transitions from step 370 to step 375, where the blended, mixed composition of step 370 is loaded into the mold provided in step 310. In step 380, the blended composition disposed in the mold is densified.

In certain embodiments, step 380 includes using isostatic pressing to densify the blended ceramic, resin, and reinforcement. In certain embodiments, step 380 includes using uniaxial pressing to densify the blended ceramic, resin, and reinforcement. In certain embodiments, step 380 includes using/applying vibration to densify the blended ceramic, resin, and reinforcement.

In certain embodiments, the blended composition of step 370 comprises between about 50 to about 95 weight-percent ceramic powder, between about 5 to about 25 weight-percent resin system, and between about 0 to about 25 weight-percent reinforcing fiber. As described herein, "about" is used to mean that a difference in weight percentage is plus or minus ten percent (10%). As a general matter, the weight percentage of resin system increases as the average particle dimension of the ceramic powder decreases. The weight percentages of the ceramic powder, the resin system, and the reinforcing fiber are adjusted respectively to achieve a certain Grain Fineness Number (AFS 11-6-00-S) to ensure a particular particle size distribution in the molding composition.

As those skilled in the art will readily appreciate, a Grain Fineness Number ("GFN") is a concept developed by the American Foundry Society for rapidly expressing the average grain size of a given particle distribution. It approximates the number of microns per inch of that sieve that would just pass the sample if its grains of uniform size. It is approximately proportional to the surface area per unit of weight of sand, exclusive of clay.

The optimal grain fineness number (GFN) in a system is determined by the type of metal poured, pouring temperatures, casting product mix (heavy vs. light castings) and required surface finish. After that optimal fineness level is determined, maintaining a consistent grain structure becomes a critical factor in the quality of the final castings. GFN is a measure of the average size of the particles (or grains).

EXAMPLE I

The grain fineness of molding sand is measured with the use of a test referred to as sieve analysis, which is performed as follows:

1. A representative sample of the sand is dried and weighed, then passed through a series of progressively finer sieves (screens) while they are agitated and tapped for a 15-minute test cycle.
2. The particles retained on each sieve (grains that are too large to pass through) are then weighed and recorded.
3. The weight retained on each sieve is divided by the total sample weight to arrive at the percent retained on each screen.
4. The percentage of particles retained is then multiplied by a factor, or multiplier, for each particular screen (Table 1). The factors reflect the fact that the sand particles retained on a particular sieve (e.g. 50 microns) are not all 50 microns in size, but rather smaller than 40 microns (i.e. it passed through a 40 micron screen) and larger than 50 microns (if the sand particles won't pass through a 50 micron screen). The result should be rounded to one decimal place.
5. The individual screen values then are added together to obtain the AFS-GFN of the sand, representing an average grain fineness (Table 1).

This AFS-GFN number is the weighted mathematical average of the particle size for that sand sample. Many metal casting facilities have developed computer spread sheets to perform these calculations, limiting the potential for human error.

By itself, the GFN does not identify a good molding material, or produce the qualities needed in a particular metal casting sand system. Because GFN represents an average fineness, particle blends comprising resin particles in combination with ceramic particles with very different grain size distribution may have similar GFN numbers. This being the case, the distribution of grains on the screens is another critical factor. The distribution refers to the quantity of particles retained on each individual sieve, rather than the average of all particles retained on all sieves.

Note: U.S. screens are manufactured using inches as the measurement for the screen openings (openings per linear inch), as designated in ASTM E-11. Some screen manufacturers in Europe and Asia may have metric screen size openings. AFS measurements using metric screens will not compare directly to U.S.-based screen measurements.

TABLE 1

Mathematical Factors for Calculation of AFS-GFN (sample size of 78.4 g)
Sieve Size on Sieve (g) Retained Multiplier Product *

6 Micron 0 0 0.03 0
12 Micron 0 0 0.05 0
20 Micron 0 0 0.1 0
30 Micron 0.7 0.9 0.2 0.18
40 Micron 3.9 4.9 0.3 1.47
50 Micron 19.4 24.7 0.4 9.88
70 Micron 37.3 47.6 0.5 23.8
100 Micron 16.3 20.8 0.7 14.56
140 Micron 0.8 1 1 1
200 Micron 0 0 1.4 0
270 Micron 0 0 2 0
TOTAL 78.4 100-50.89 **

\* Product is percent retained times multiplier
\*\* AFS GFN = 50.9 (sum of all products rounded to one decimal)

In step 385, the process initiates the cure of the displacement(s). In certain embodiments, step 385 includes heating the mold at a temperature of about 200° C. for about one hour. As described herein, "about" is used to mean that a difference in temperature or duration of time from the stated value is plus or minus ten percent (10%). In certain embodiments, step 385 includes using a forced air oven. In certain embodiments, step 385 includes disposing the mold onto a conveyor belt that transports the mold through an oven. In certain embodiments, step 385 includes the use of infrared heating.

In certain embodiments, the mold of step 310 is formed with the use of a UV transparent material, and the binder of step 310 comprises a UV-curable binder. Here, in step 385 the mold is exposed to UV irradiation to effect the cure of the binder composition.

After the cure of the displacements at a temperature of about 200° C., the displacements can be machined into a final desired shape if a secondary machining is required in step 390. During step 395, the displacements cured at step 385 can be machined with high precision into casting products with different dimensions and requirements (such as products having threads, for example). If a secondary machining is not required, the current process flow continues from step 390 to step 397.

Referring to step 397, in certain embodiments, the displacements formed at step 385 or step 395 are further treated to enhance their mechanical properties in preparation for the metal casting process. If the displacements formed at step 385 or step 395 require to have their properties further enhanced, the process transitions from step 397 to step 440 (FIG. 4). To the contrary, if the formed displacements from step 385 or step 395 do not need any further property enhancement, the method transitions from step 397 to step 399 and terminates.

Because the presence of high combustibles and volatile elements or inclusions in the displacements cause pinholes, smoke, blows, gas, and rough surface in the or during the casting of the product, the embodiment of the process is judiciously configured to eliminate any material(s) or additive(s) in the displacements that may or will volatize or volatilize when molten metal is poured onto the displacements during the casting process. As a result, violent vaporization and/or thermal decomposition of any material in the displacements will not take place. Therefore, the resulting metal casting is formed with a smooth surface.

Moreover, displacements for metal casting need to have a sufficient compactability to avoid cuts and washes, friable broken edges, crushes, hard-to-lift pockets, penetration, and erosion scabbing. Also, the compactability cannot be too high to cause a formation of oversized castings.

Further, displacements need to have a balanced compressive strength to be strong under the pouring pressure of the liquid molten to avoid formation of inclusions, erosions, friable broken edges, etc.

A supplemental, related embodiment of the method has been developed to enhance the mechanical properties of an as-formed displacement using the steps of FIG. 4. Referring now to FIG. 4, in step 410, the method provides (N) displacement articles for use in a metal casting system. In certain embodiments, one or more of the (N) displacements were previously formed.

In step 420, the method sets a counter (i) equal to 1. In step 430, a determination is made if an (i)th displacement article possesses operationally-satisfactory properties. If it is determined in step 430 that the mechanical and thermal properties of an original (i)th displacement are sufficient for use in casting process, then the method transitions from step 430 to step 432, where it is determined if (i) equals (N) (i.e. if the properties of each of the (N) displacements of step 410 have been evaluated). If the method determines in step 432 that (i) equals (N), then the transition from step 432 to step 490 occurs and the process ends or terminates. Alternatively, if the method determines in step 432 that (i) does not equal (N), then the method transitions from step 432 to step 434, where the (i) is set to be equal to (i+1). The flow of the process transitions from step 434 to step 430 and continues as described herein.

If the method determines in step 430 that the mechanical and thermal properties of an original (i)th displacement are not operationally-sufficient, then the method transitions from step 430 to step 440, whereas previously-prepared or formed (i)th displacement is immersed in a mixture that includes one or more polymer precursor compounds, such as and without limitation, carbon-containing resins.

In step 450, the (i)th displacement, impregnated with the one or more polymer precursors, is heated about 1000° C. to form polymeric microstructures that are precursors to high-carbon solids, in combination with a conversion of these polymers to functional high-carbon solids (sometimes interchangeably referred to as "glassy carbon").

Glass-like carbon, often called glassy carbon or vitreous carbon, is a non-graphitizing, or nongraphitizable, carbon which combines glassy and ceramic properties with those of graphite. The most important properties are high temperature resistance, hardness (7 Mohs), low density, low electrical resistance, low friction, low thermal resistance, extreme resistance to chemical attack, and impermeability to gases and liquids.

The structure of glassy carbon has long been a subject of debate. Early structural models assumed that both sp2- and sp3-bonded carbon atoms were present, but it is now known that glassy carbon is 100 percent sp2 hybridized carbon. The structure of glassy carbon consists of long, randomly oriented microfibrils (15-50 A° wide) that bend, twist, and interlock to form robust interfibrillar nodes. More recent research has suggested that glassy carbon comprises the Buckminster fullerene ($C_{60}$).

Glassy (or vitreous) carbon is typically a hard solid prepared with the use of heat treatment at elevated temperatures of polymer precursors such as copolymer resins of phenolformaldehyde or furfuryl alcohol-phenol.

In certain embodiments, the polymer precursor compound(s) of step 440 is selected from the group consisting of furfuryl alcohol, phenol formaldehyde oligomer, acetone-furfural, furfuryl alcohol-phenol oligomer, polyvinyl chloride oligomer, polyvinylidene chloride oligomer, polyacrylonitrile oligomer, cellulose, and any combinations thereof.

In one embodiment, the displacement in step 440 is immersed in 10 percent-by-weight furfuryl alcohol 2 in chloroform, alcohol, benzene, ethanol, ethyl ether, water, acetone, or ethyl acetate, until a weight of the displacement stops increasing.

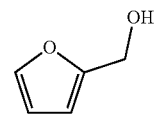

2

In certain embodiments, a catalyst is added to the furfuryl alcohol, such as a zinc chloride. In other embodiment, a catalyst is not added.

In step 450, the displacement, after soaking, is fired at about 1000° C. with a temperature ramp rate of about 60° F./hour for about 24 hours under an inert atmosphere to first form polymeric material 3 (with a structure shown below) between the ceramic powder (provided in step 310) particles, where polymer 3 reinforces the previously formed displacement.

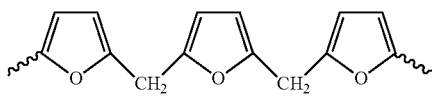

3

In certain embodiments, polyunsaturated sequences are formed by successive hydride/proton abstractions from certain methylene groups in polymer 3 to form polymer 4 comprising only $sp^2$ hybridized carbon atoms.

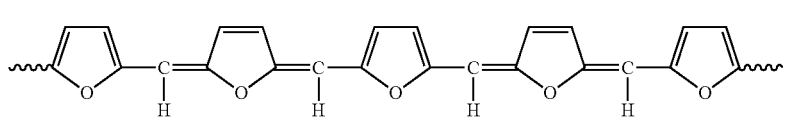

4

During the heating of step 450, polymer 3 and/or polymer 4 are continuously converted into the fullerene structure 1, thereby forming glassy carbon moieties within the original displacement to impart more desirable (from the point of view of the metal casting process) mechanical and electrical properties of the enhanced displacement.

In step 460, the determination is made whether the mechanical and thermal properties of an (i)th displacement have been sufficiently enhanced. If it is determined in step 460 that the mechanical and/or electrical properties of the treated displacement (of step 440) do not include a desired compactability level and/or desired compressive strength, then the method transitions from step 460 to step 440, and continues as described herein.

Alternatively, if the method determines in step 460 that the mechanical and thermal properties of an (i)th displacement have been sufficiently enhanced, then the method transitions from step 460 to step 470, where the determination is made if (i) equals (N) (i.e. if each of the (N) displacements of step 410 have been treated). If (i) equals (N), then the process transitions from step 470 to step 490 and terminates. Alternatively, if it is determined in step 470 that (i) does not equal (N), then the method transitions from step 470 to step 480, where the (i) is set of be equal to (i+1). The method transitions from step 480 to step 440 and continues as described herein.

While the preferred embodiments of the present invention have been illustrated in detail, it should be apparent that modifications and adaptations to those embodiments may occur to one skilled in the art without departing from the scope of the present invention.

We claim:

1. A method for forming a displacement for a metallic casting, the method comprising:
   forming a first displacement by
      disposing a powder blend into a mold, the powder blend comprising a plurality of ground ceramic particles and a plurality of ground resin particles;
      densifying said powder blend while in said mold; and
      heating said mold at about 200° C.;
   impregnating said first displacement with a polymer precursor compound to form a second displacement; and
   heating said second displacement at about 1000° C. for about 24 hours to form a third displacement.

2. The method of claim 1, wherein said impregnating comprises:
   immersing said first displacement in a liquid mixture comprising said polymer precursor compound;
   monitoring a weight increase of said first displacement;
   when a weight of said first displacement no longer increases with time, determining that said second displacement is formed.

3. The method of claim 1, further comprising:
   heating said first displacement at about 1000° C. for about 24 hours before the impregnating said first displacement with the polymer precursor compound to form the second displacement.

4. The method of claim 1, wherein the disposing includes disposing the powder blend comprising the plurality of ground ceramic particles with a maximum dimension, of a ground ceramic particle, of less than about 150 microns.

5. The method of claim 1, wherein the disposing includes disposing the powder blend comprising the plurality of ground resin particles with a maximum dimension, of a ground resin particle, of less than about 100 microns.

6. The method of claim 1, further comprising selecting said polymer precursor compound from the group consisting of furfuryl alcohol, phenol formaldehyde oligomer, acetone-furfural, furfuryl alcohol-phenol oligomer, polyvinyl chloride oligomer, polyvinylidene chloride oligomer, polyacrylonitrile oligomer, and cellulose.

7. The method of claim 6, wherein the selecting said polymer precursor compound includes selecting furfuryl alcohol.

8. The method of claim 1, wherein the heating said second displacement to form the third displacement includes forming the third displacement such that the third displacement comprises glassy carbon having ceramic particles disposed therein.

9. The method of claim 8, wherein the heating said second displacement to form a third displacement includes forming the glassy carbon from a first polymer having a structure:

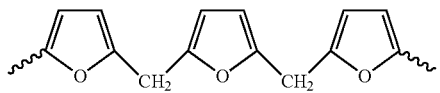

10. The method of claim 8, wherein the heating said second displacement to form the third displacement includes forming the glassy carbon from a second polymer having a structure:

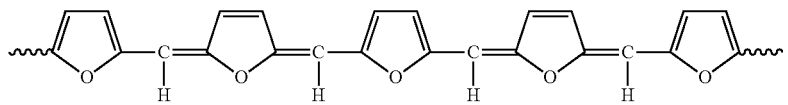

11. The method of claim 8, wherein the heating said second displacement to form the third displacement includes forming the glassy carbon such that the glassy carbon further comprises Buckminster fullerene ($C_{60}$).

12. The method of claim 1, wherein the disposing the powder blend includes providing the powder blend with a plurality of reinforcing fibers added thereto.

13. The method of claim 12, wherein said providing the powder blend includes disposing reinforcing fibers within the powder blend, each reinforcing fiber having a length of about 200 microns.

14. The method of claim 13, wherein the disposing the reinforcing fibers within the powder blend includes disposing reinforcing fibers formed from uncoated milled fiber glass.

* * * * *